United States Patent [19]

Björklund et al.

[11] Patent Number: 5,414,612
[45] Date of Patent: May 9, 1995

[54] HVDC TRANSMISSION WITH A CONVERTER CONNECTED BETWEEN AN AC VOLTAGE AND A DC LINK COMMON TO THE CONVERTERS

[75] Inventors: Per-Erik Björklund, Falun; Bernt Bergdahl, Ludvika; Urban Aström, Saxdalen, all of Sweden; John J. Vithayathil, Portland, Oreg.

[73] Assignee: Asea Brown Boveri AB, Västerås, Sweden

[21] Appl. No.: 101,072

[22] Filed: Aug. 3, 1993

[51] Int. Cl.⁶ .............................................. H02J 3/36
[52] U.S. Cl. .................................. 363/35; 363/37; 363/39
[58] Field of Search .................. 363/34, 35, 37, 51, 363/39

[56] References Cited

U.S. PATENT DOCUMENTS 4,648,018  3/1987  Neupauer ........................ 363/35
4,649,466  3/1987  Rogowsky ....................... 363/35
4,894,762  1/1990  Steinshorn ...................... 363/35

Primary Examiner—Brian K. Young
Assistant Examiner—Y. Jessica Han
Attorney, Agent, or Firm—Watson, Cole, Grindle & Watson

[57] ABSTRACT

An HVDC transmission has two converters (SR1, SR2). Each converter is connected between an alternating-voltage network (N1, N2) and a d.c. link (L1, L2) common to the converters. At least one converter is connected to its alternating-voltage network without the use of any full transformer, for example directly, or via an inductor or an autotransformer, or via series capacitors. The transmission has a mutual inductor (IB) which is arranged on the d.c. side of the converter and which has two windings (IB1, IB2) which are each connected to a respective one of the d.c. supply lines of the converter and are magnetically coupled to each other, the inductor being designed and connected so as to exhibit a high impedance to ground mode currents.

22 Claims, 9 Drawing Sheets

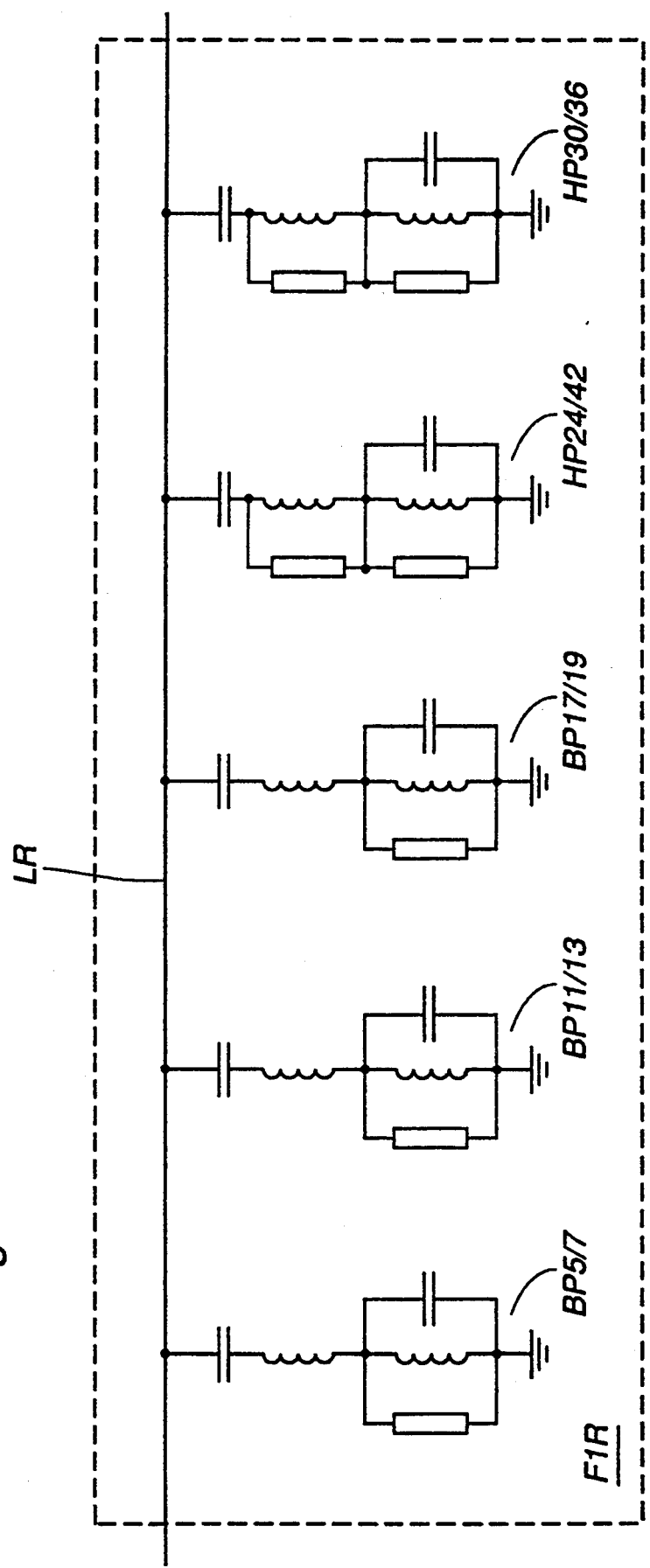

HVDC TRANSMISSION WITH A CONVERTER CONNECTED BETWEEN AN AC VOLTAGE AND A DC LINK COMMON TO THE CONVERTERS

TECHNICAL FIELD

The present invention relates to an HVDC transmission comprising at least two converters, each converter being connected between an alternating-voltage network and a direct-current link common to the converters, at least a first converter being connected to its alternating-voltage network without the use of any separate winding transformer.

In this application the concept "HVDC transmission" relates to an electric plant or equipment for power transmission by means of high-voltage direct current. The concept comprises two main types of plants. The first of these types consists of plants adapted for power transmission between two or more converter stations, which are located in spaced relationship to each other and which are interconnected by means of direct-current carrying cables or overhead lines. The second type consists of so-called back-to-back connections, in which two converters arranged in the same converter station are each connected to their own alternating-voltage network and are interconnected on their d.c. sides and adapted for controllable power transmission between the alternating-voltage networks.

In the first type of plants, the d.c. link consists of the cable/cables or lines which connect the d.c. sides of the converter stations. In the second type of plants, the d.c. link generally consists of only one pair of busbars in the station. However, in both cases the d.c. link comprises, in a known manner, certain devices for smoothing and filtering of the direct current, for current and voltage measurement, for protection against overvoltages, etc.

The fact that a converter is connected to its alternating-voltage network "without the use of any separate winding transformer" means that the converter is connected to the alternating-voltage network in some other way than by means of a separate winding transformer. Thus, a converter which is connected without the use of any separate winding transformer may have its alternating-voltage terminals galvanically connected to the alternating-voltage network, directly or via an autotransformer, and possibly via inductors for current limitation. Alternatively, a converter which is connected without the use of any separate winding transformer may have its alternating-voltage terminals connected to the alternating-voltage network via series capacitors.

Analogously, the concept "transformerless" connection is used in this application in the event that no transformer of any kind, thus neither a separate winding transformer nor an auto transformer, is used for connection of a converter to its alternating voltage terminal. Thus, in this case the converter may have its alternating-voltage terminals galvanically connected to the alternating-voltage network, or via series capacitors.

BACKGROUND ART

In an HVDC transmission, each one of the converters usually consists of two series-connected six-pulse bridges. Each bridge is connected to the alternating-voltage network via a separate winding transformer. The transformers of the bridges (or the valve windings of a common transformer) are designed with different connections (usually star and delta connections, respectively) in such a way that the alternating voltages of the bridges are subjected to a 30° phase shift and the converter hence becomes a twelve-pulse converter. HVDC transmissions of this kind are amply described in the literature, for example in Brich Uhlmann: "Power Transmission by Direct Current", Spring-Verlag Berlin Heidelberg New York 1975 (see, e.g., FIG. 2.7, p. 15, or FIG. B.1, p. 187). Since the converter bridges are connected to the alternating-voltage network via transformers, a possibility of technical-economic optimization of the direct voltage and direct current levels of the transmission is obtained. Since the converter bridges are connected to the alternating-voltage network via separate winding transformers, a galvanic separation is obtained between the bridges and the alternating-voltage network. This means that, in the manner described above, two converter bridges can be d.c.-series-connected and thus that higher resultant pulse numbers and a reduction of the harmonic content (theoretically an elimination of the lowest harmonics) can be obtained. In this way, the amount of filter equipment can be reduced, which is important since the cost of the filter equipment constitutes an important part of the total cost of a typical HVDC plant. The galvanic separation also means that a converter cannot generate a direct current in the alternating-voltage network, which would involve a risk of certain disturbances, such as transformer saturation.

The advantages of the type of converter station described above have caused it to become practically universally prevailing in HVDC plants.

In a dissertation entitled "HGU-Kurzkupplung ohne Transformatoren", by Dipl.-Ing. Knut Gebhardt, Technische Hochschule Darmstadt, 1976/1977, it has been proposed to connect the converters in a transformerless manner in a back-to-back connection. In this dissertation, the above-described conventional connection is shown in FIG. 1, page 4, and examples of a transformerless connection are shown in FIG. 2, page 5. At first sight, the transformerless connection is economically advantageous since the relatively high cost of the converter transformers is eliminated. However, the connection has several disadvantages, which have caused the connection not to be used to any significant degree in practice. First of all, the direct-voltage level of the plant is determined by the voltage in the alternating-voltage networks, which means that there is no possibility of optimization of the d.c. link and the converters with respect to voltage and current. Secondly, a transformerless HVDC plant is limited to six-pulse operation of the converters, which results in the existence of harmonics of low orders (5 and 7), which necessitate considerably more costly equipment for harmonic filtering. Thirdly, in a plant of this kind, third tone currents (harmonic currents of the orders 3, 9, 15, 21 . . . ) are generated on the d.c. side of a converter. These currents flow out into the alternating-voltage network of the converter. In this network, the currents are of zero-sequence type and give rise to considerable drawbacks in the form of telecommunication disturbance and voltage distortion in the network. In less strong alternating-voltage networks, the voltage distortion becomes such a serious disadvantage that the transformerless connection cannot be used without taking special steps.

However, it is, of course, possible to arrange filters for the above-mentioned third-tone currents. Such a filter can thus be arrange don the a.c. side of a converter. However, the filter is large and expensive, and it has proved difficult to avoid resonance effects between the filter and the alternating-voltage network. Alternatively, a third-tone filter can be arranged in the form of a suppression filter on the d.c. side of the converter. Also in this case, the dimensions and costs of the filter equipment are high, and a considerable risk of resonance effects arises. These facts contribute to the transformerless connection only being considered possible in connection with strong alternating-voltage networks.

SUMMARY OF THE INVENTION

The invention aims to provide an HVDC transmission which is simpler and less expensive than hitherto used transmissions while at the same time, by reducing or completely avoiding the above-described network disturbances on the alternating-voltage side (in the form of telecommunication disturbances and voltage distortion), it can be used also with weak alternating-voltage networks.

What characterizes an HVDC transmission according to the invention will become clear from the appended claims.

BRIEF DESCRIPTION OF THE DRAWINGS

In the following the invention will be described in greater detail with reference to the accompanying FIGS. 1-9.

FIG. 4 shows the design of a phase of the harmonic filter in the back-to-back connection according to FIG. 2.

DESCRIPTION OF THE PREFERRED EMBODIMENTS

Figure 1:
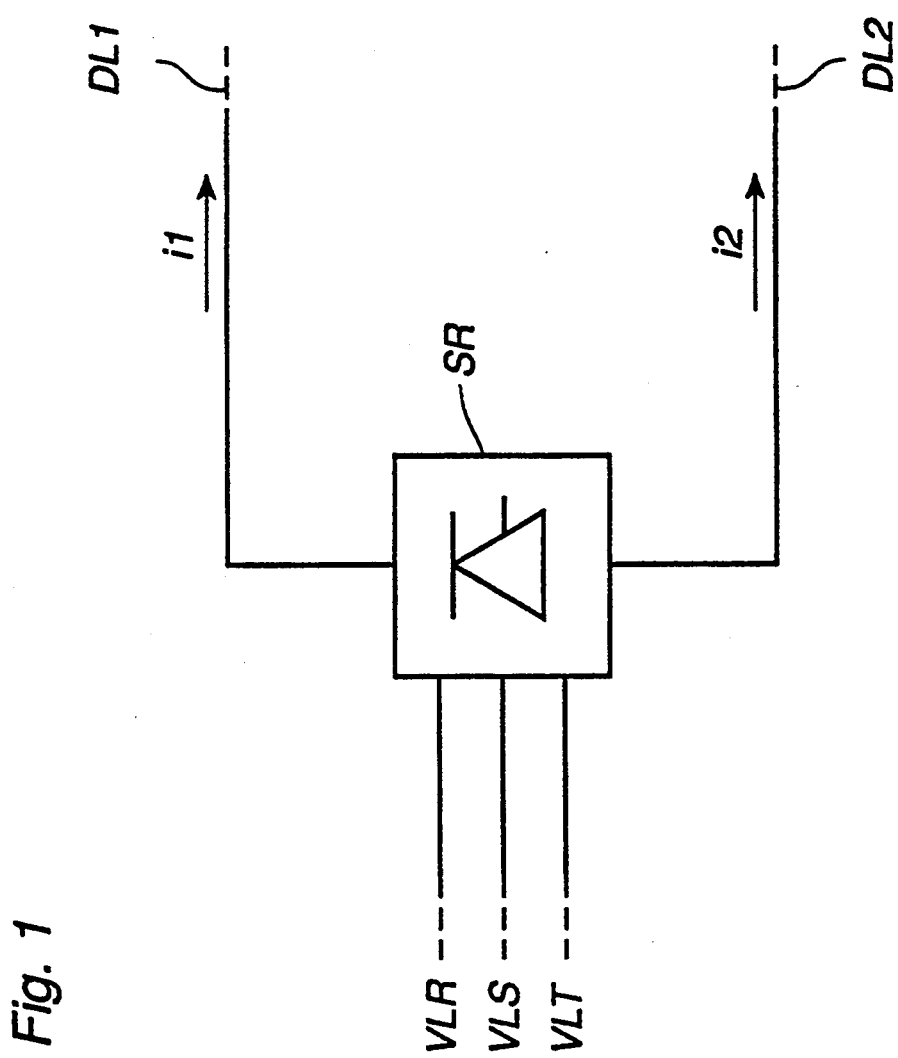
FIG. 1 illustrates the concepts ground mode current and pole mode current.

With reference to FIG. 1, the concepts ground mode current and pole mode current, which admittedly are being generally used, will first be defined. A converter SR has the d.c. supply lines DL1 and DL2 as well as the a.c. supply lines VLR, VLS and VLT. The currents, flowing in the d.c. supply lines at a certain moment, have the instantaneous values i1 and i2, respectively. Both currents are defined by their positive directions out from the converter. The pole mode current on the alternating-voltage side of the converter is then $(i1-i2)/2$. The ground mode current on the direct-voltage side of the converter is $(i1+i2)/2$.

Figure 2:
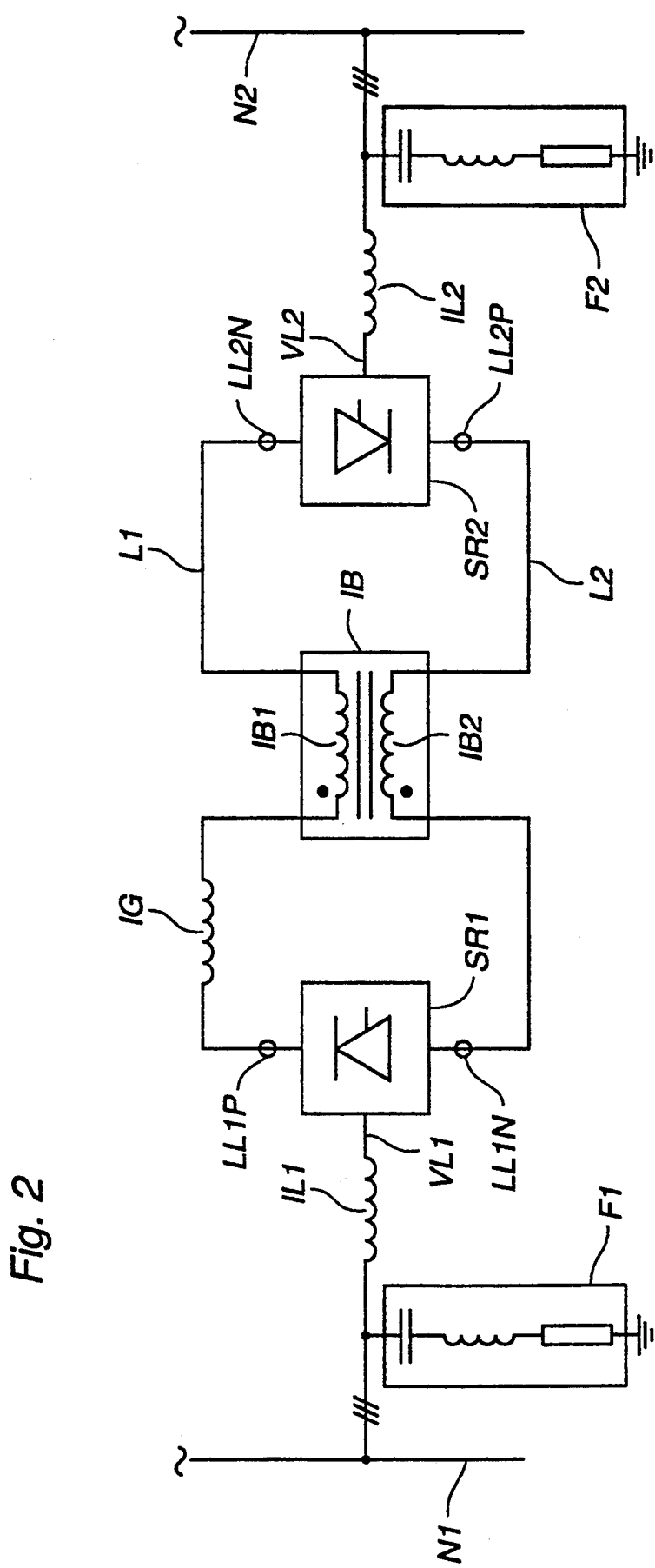
FIG. 2 shows a back-to-back connection according to the invention.

FIG. 2 shows in the form of a single-line diagram a back-to-back connection according to the invention. It is intended for controllable power transmission between two three-phase electric a.c. power networks N1 and N2. It comprises two controllable high-voltage converters SR1 and SR2, arranged in one and the same converter station. The a.c. supply conductors VL1 and VL2 of the converters are connected to the respective alternating-voltage networks N1 and N2 via current-limiting inductors IL1 and IL2. Further, on their a.c. side each converter has a schematically shown harmonic filter, F1 and F2, respectively. The d.c. terminals LL1P, LL1N and LL2P, LL2N, respectively, of the converters are interconnected via conductors L1 and L2, which consist of busbars or the like in the converter station. In one of these conductors, a smoothing inductor IG for the direct current is arranged in conventional manner. Further, the plant is provided with an inductor IB for blocking of the ground mode current. This inductor has two windings IB1 and IB2, which are each connected into a respective one of the two d.c. conductors L1 and L2, and which have the winding directions marked in the figure. The inductor is designed such that its two windings are magnetically well coupled to each other and such that the windings are symmetrical in relation to each other. In this way, the inductor will have a high impedance to ground mode currents, both to fundamental and to harmonic components, and, in principle, a low impedance to pole mode currents.

In this way, the inductor IB will effectively block the ground mode currents and in this way greatly reduce the zero-sequence currents on the a.c. sides of the converters and hence the initially mentioned disturbances which these currents cause in the alternating-voltage network. This makes it possible to use a transformerless HVDC transmission for connection not only to very strong alternating-voltage networks but also to weaker networks.

Figure 3:
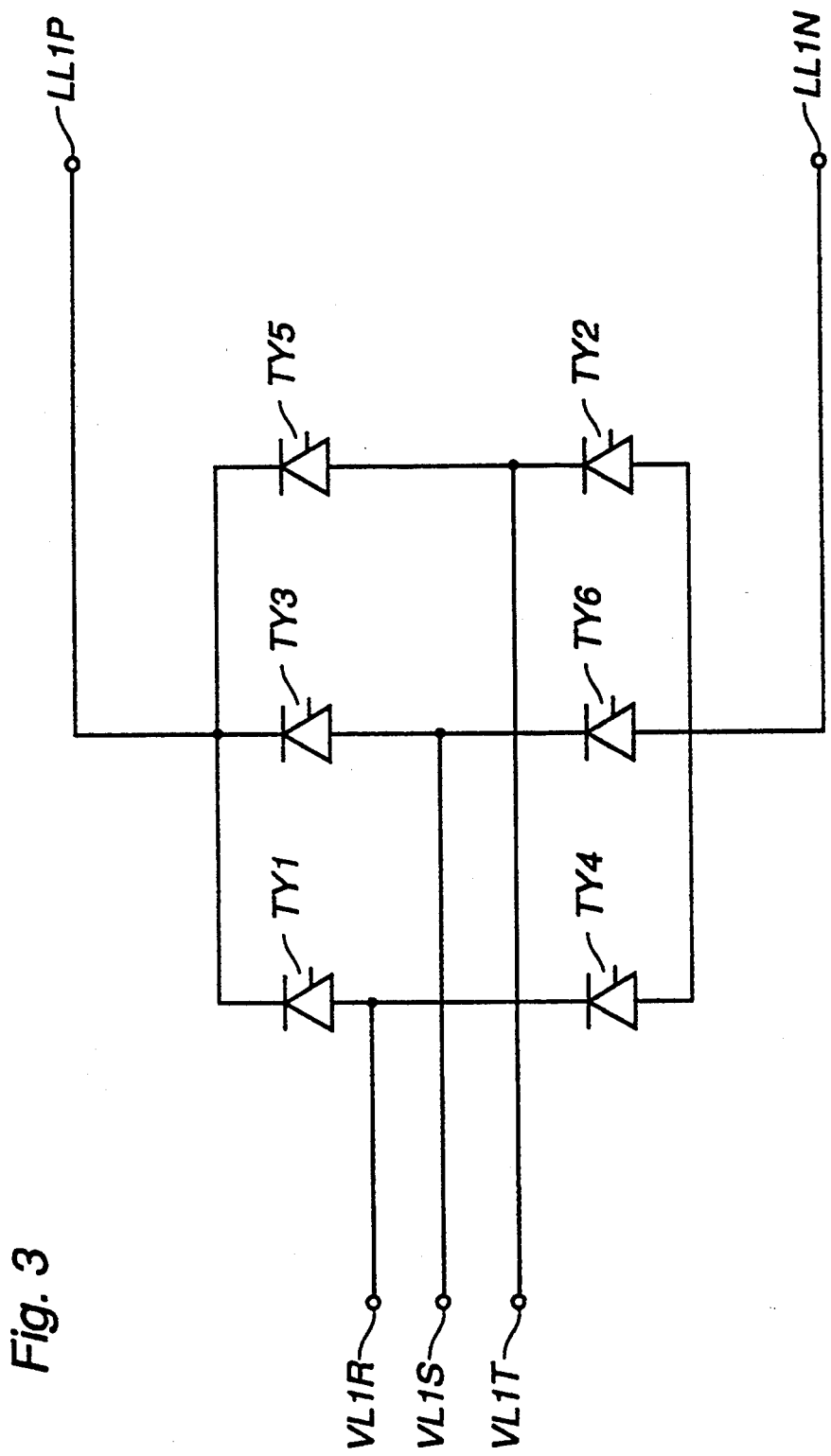
FIG. 3 shows one of the converters in the back-to-back connection according to FIG. 2.

FIG. 3 shows the main circuit of the converters SR1 in the back-to-back connection according to FIG. 2. The converter is a converter of the same kind as used at present in HVDC transmissions. It is a six-pulse line-commutated phase-angle controlled thyristor converter with the valves TY1-TY6. Each valve consists of a plurality of series-connected thyristors with parallel-connected damping circuits and overvoltage protection. The converter has the d.c. connections LL1P and LL1N and the a.c. connections VL1R, VL1S, VL1T. The converter SR2 is designed in the same way.

The current-limiting inductors IL1 and IL2 replace the impedance of the converter transformer of conventional HVDC transmissions. The inductors may suitably be designed as air inductors and are given an inductance so adapted that the inductors limit the valve currents to harmless values in connection with the types of faults which may occur, for example short circuit or ground fault.

FIG. 4 shows an example of the design of one phase F1R in the filter circuit F1 in the back-to-back connection according to FIG. 2. It is connected to the a.c. conductor LR between the network N1 and the converter SR1. The filter circuit consists of double-tuned band-pass filters for the tones 5 and 7 (BP5/7), 11 and 13 (BP11/13) and the tones 17 and 19 (BP17/19), and double-tuned high-pass filters for the tones 24 and 42 (HP24/42) and for the tones 30 and 36 (HP30/36). The high-pass filters are suitably designed so as to provide sufficient damping also for the tones of the orders 47 and 49.

Figure 5A:
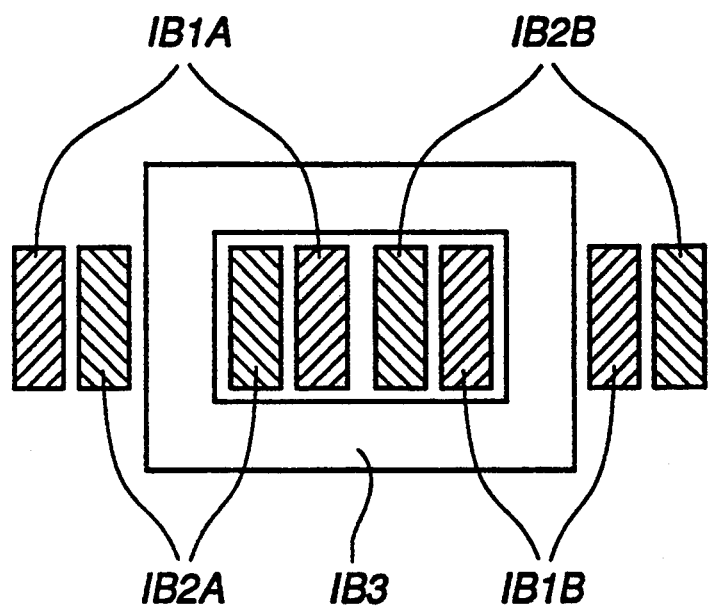
FIGS. 5a and 5b show an example of the design of the blocking inductor in the back-to-back connection in FIG. 2.
Figure 5B:
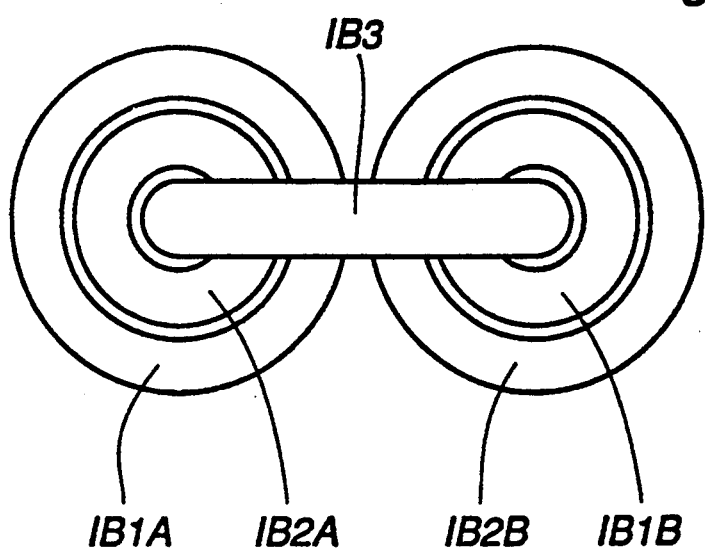

To achieve the desired function, it is important that the blocking inductor IB in FIG. 2 is designed such that a good magnetic coupling is obtained between the two windings of the inductors. Further, it is important to achieve a high degree of symmetry between the two windings of the inductor. FIGS. 5a and 5b show an example of the design of the blocking inductor, in which both of these requirements are fulfilled. FIG. 5a shows a section through the inductor in the plane which contains the axes of rotational symmetry of the windings. FIG. 5b shows the inductor as viewed in the direction of the axes of rotational symmetry. The inductor has an iron core IB3. The windings IB1 and IB2 each consist of two series-connected winding halves. On a first core leg, one half IB1A of the winding IB1 and one half IB2A of the winding IB2 are arranged with the winding IB1A outside the winding IB2A. On a second core leg the second half IB1B of the winding IB1 and the second half IB2B of the winding IB2 are arranged with the winding IB2B outside the winding IB1B. Since the winding halves on each core leg are arranged close to each other, a good magnetic coupling is obtained between the windings. Since the radial mutual positions of the windings are opposite to each other in the two core legs, the desired good symmetry between the windings if obtained.

Figure 6:
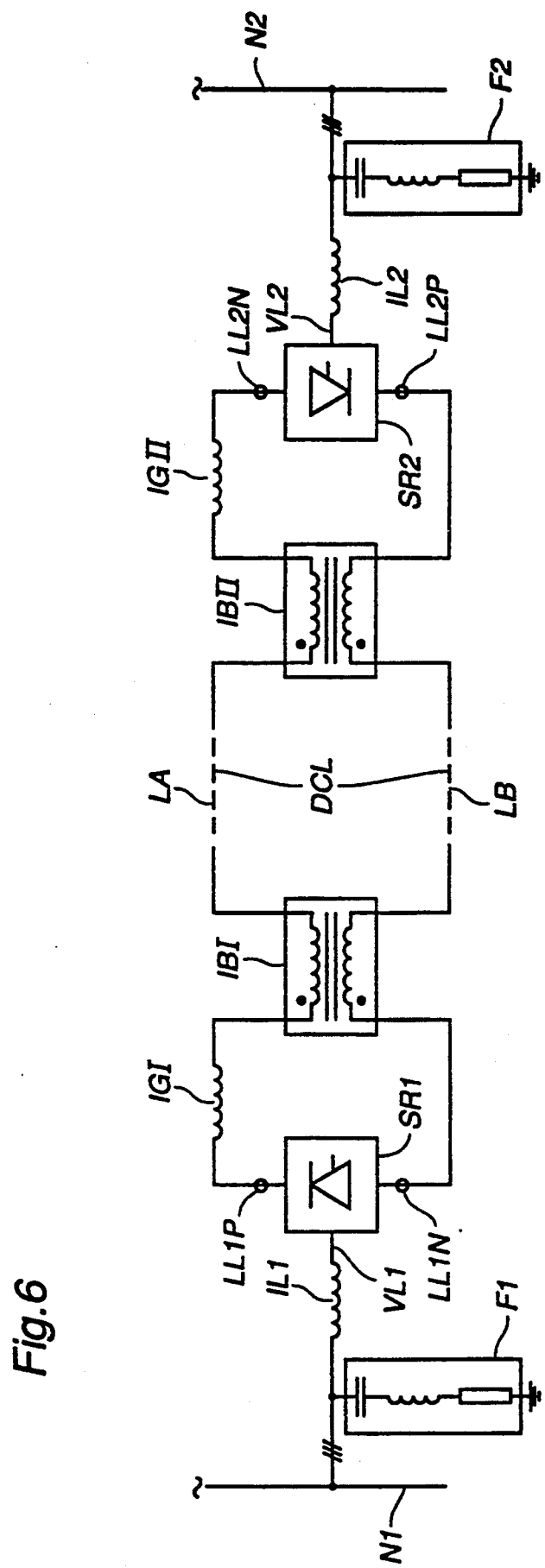
FIG. 6 schematically shows an HVDC transmission consisting of two geographically separated converter stations which are interconnected by a line.

FIG. 6 schematically shows an HVDC transmission consisting of two geographically separated converter stations with converters SR1 and SR2, which are interconnected through a line DCL with the conductors LA and LB. The line may consist of an overhead line or of a cable disposed in the ground or in water, or of a combination thereof. Each station is designed in the manner shown in FIG. 2 and its components have the same designations as in FIG. 2. In this case, however, as opposed to what is the case in the plant shown in FIG. 2, each station is provided with a blocking inductor, IBI and IBII, respectively. In this way, an efficient blocking of the ground mode currents of each converter is ensured. If only one single blocking inductor were to be used, for example in connection with the converter SR1, it would not be possible to obtain an efficient blocking of the ground mode currents of the converter SR2 because of the line capacitance. Also, in the transmission according to FIG. 6 each station has a smoothing inductor, IGI and IGII, respectively.

Figure 7:
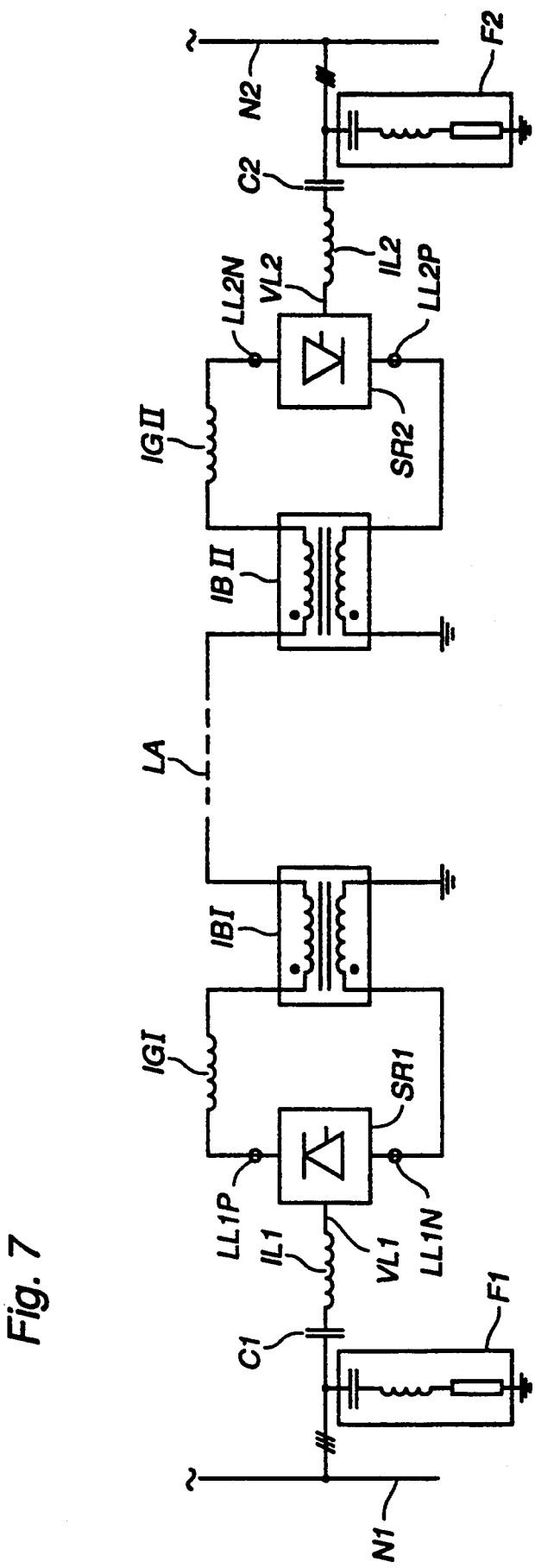
FIG. 7 shows an HVDC transmission according to the invention, in which the converters are connected to their alternating-voltage networks via series capacitors.

FIG. 7 shows an HVDC transmission according to the invention, which substantially corresponds to the one shown in FIG. 6, but in which the converters have been connected to their alternating-voltage networks via series capacitors C1 and C2, respectively. The series capacitors serve as direct-voltage barriers, and hence they make possible grounding of the direct-voltage side of each converter at one point. In addition to blocking harmonics, the mutual inductances IBI and IBII, respectively, here also block fundamental component currents of ground mode type, currents which would otherwise arise and make conversion impossible. The figure shows how one pole of each converter is grounded, whereby the line between the converter stations may consist of one single conductor LA. The direct current return takes place through ground. FIG. 7 thus shows a monopolar HVDC transmission.

Figure 8:
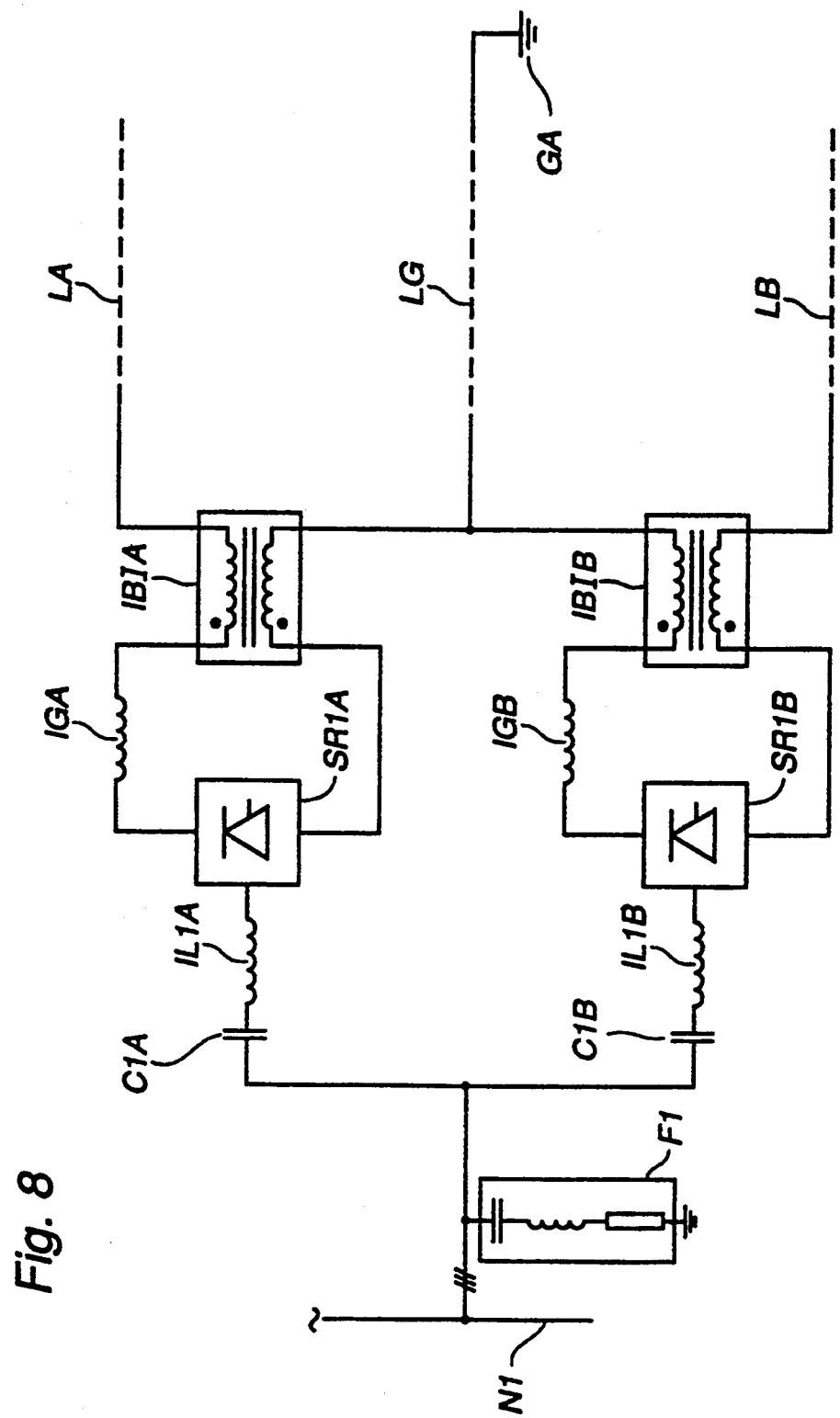
FIG. 8 shows a converter station in a bipolar HVDC transmission according to the invention.

However, the use of series capacitors in the manner described with reference to FIG. 7 also makes possible the use of the invention in a bipolar HVDC transmission. One of the two converter stations in such a transmission is shown in FIG. 8. It has two converters, SR1 and SR2. Each one of them is connected to the network N1 via a series capacitor, C1A and C1B, respectively, and a current-limiting inductor, IL1A and IL1B, respectively. Filter equipment F1, common to the converters, for harmonic filtering is connected to the alternating-voltage side of the converters. Each converter is provided with a blocking inductor, IBIA and IBIB, respectively, designed in the manner described above, and with a smoothing inductor, IGA and IGB, respectively. The station has a ground electrode GA, which is connected to the station by a ground line LG. The converter SR1A has one of its direct-voltage connections connected to one conductor LA of the transmission line via one of the windings of the inductor IBIA and the other direct-voltage connection connected to the ground line LG via the other winding of the inductor. The converter SR1B has one of its direct-voltage connections connected to the other conductor LAB of the transmission line via one of the windings of the inductor IBIB and the other direct-voltage connection connected to the ground line LG via the other winding of the inductor.

The above description relates exclusively to such embodiments of the invention in which all the converters included in the HVDC transmission are connected in a transformerless manner—either directly galvanically or via series capacitors—to their respective alternating-voltage networks. However, also other embodiments are feasible within the scope of the invention.

Thus, for example, a converter may be connected to its alternating-voltage network via an autotransformer. Such an embodiment offers the advantages that the current and voltage levels of the d.c. link and the converter can be chosen independently of the voltage of the alternating-voltage network, that therefore the transmission can be used for power transmission between alternating-voltage networks with different voltages, that the current-limiting inductors described above (e.g. IL1 in FIG. 2) may become superfluous, and that a tap changer of the transformer can be used to take up changes in the ratio of the direct voltage of the converter to the voltage of the alternating-voltage network, which provides a possibility of working with more optimal control angles of the converter from the reactive power point of view. Since autotransformers are considerably less expensive than separate winding transformers, also in this case a considerable cost saving is obtained compared with conventional HVDC transmissions with separate winding transformers.

The converters at both ends of a d.c. link may be connected to their alternating-voltage networks via autotransformers, of the converter at one end of the link only, in which case the converter at the other end of the link is either transformerless or connected to its alternating-voltage network via a separate winding transformer.

As mentioned above, one of the converters of a transmission may be connected to its alternating-voltage network via a separate winding transformer. The converter at the other end of the link may thereby either be transformerless or also be connected via an autotransformer. The tap changer of the full transformer can thereby be utilized to take up variations in the voltage of the alternating-voltage network and the reactive power consumption thus be kept low, the d.c. link and the converters can be optimized independently of the voltage of the alternating-voltage network, and for the converter which is connected while using a separate winding transformer, no mutual inductor is needed for blocking the effect on the alternating-voltage network exerted by the link.

Figure 9:
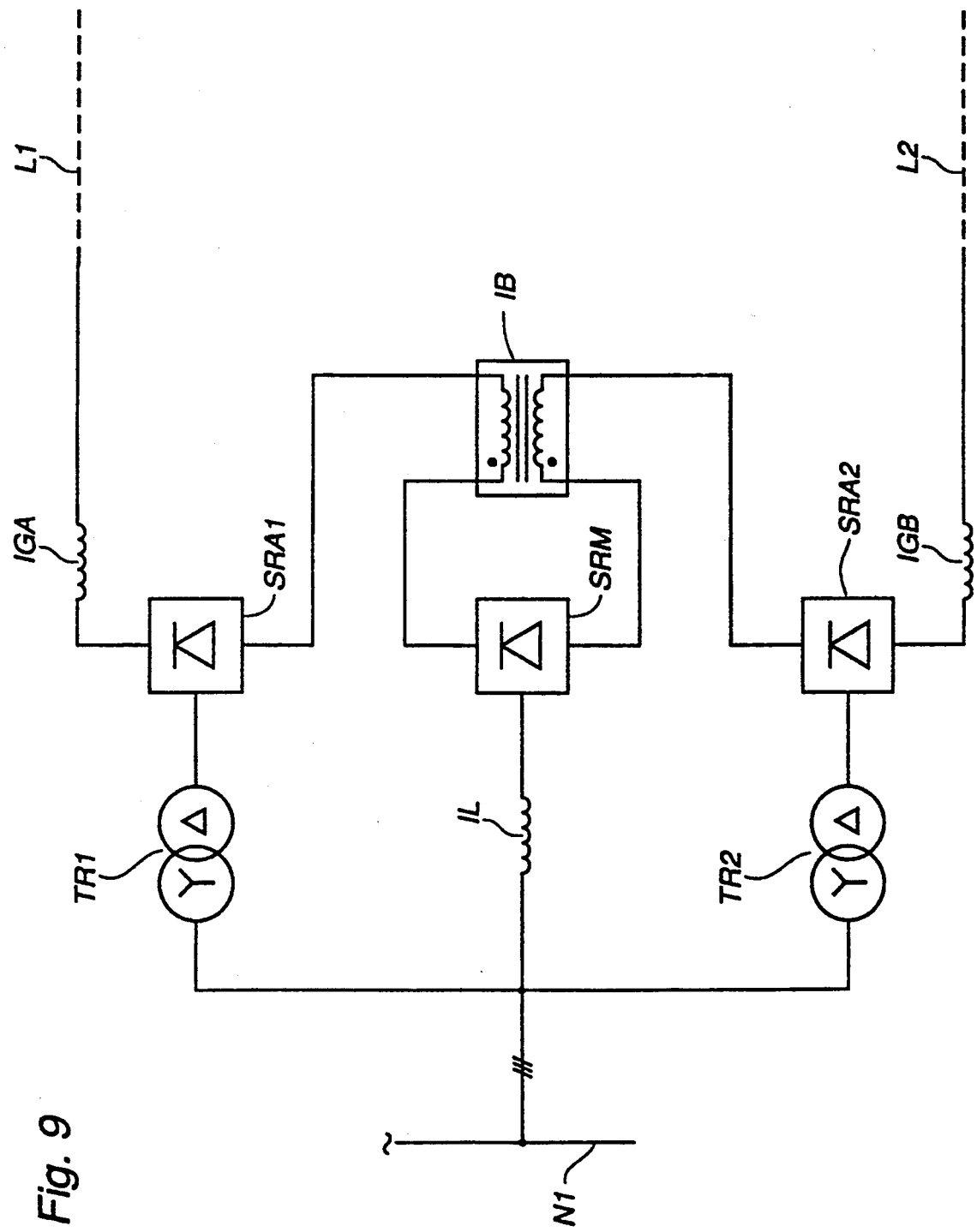
FIG. 9 shows an alternative way of balancing the direct current.

FIG. 9 shows an alternative way of balancing the direct current. According to this alternative, a transformerless converter bridge SRM (main bridge) is provided with two auxiliary bridges SRA1 and SRA2, which are provided with separate winding transformers and d.c.-connected in series with the converter bridge. The main bridge SRM is connected to the three-phase network N1 via a current-limiting inductor. IL. The auxiliary bridges are connected to the network via the Y/Δ-connected separate winding transformers TR1 and TR2, respectively. The d.c. supply lines of the main bridge are connected to a mutual inductor IB in the same way as described above.

The auxiliary bridges may have a considerably lower rated power than the main bridge. The auxiliary bridges are preferably controlled in such a way that the direct currents in the two d.c. lines L1 and L2 of the converter station are always maintained as equal as possible.

If the rated power of each one of the auxiliary bridges is half as great as that of the main bridge, and if the separate winding transformers are Y/Δ-connected, 12-pulse operation can almost be obtained and a large part of the 5th and 7th tones can be eliminated.

If the separate winding transformers of the auxiliary bridges are provided with tap changers with a wide control range, these tap changers can be utilized for compensating for variations in the alternating voltage of the network, however, at the expense of the 5th and 7th tone elimination.

In the embodiments of the invention described in this application, separate smoothing inductors, for example IG in FIG. 2, have been arranged for smoothing the direct current. Alternatively, the function of a smoothing inductor can be obtained by designing the mutual inductance in a suitable way. As described above, the mutual inductor has an impendance to pole mode currents which is low, and which is zero if the mutual inductor is ideal. By designing this inductor with a suitably adapted leakage inductance, it can be caused to provide the desired smoothing of the direct current, and a separate smoothing inductor can then be avoided.

In the embodiments of an HVDC transmission according to the invention, in which a converter is not connected to its alternating-voltage network via a transformer provided with a tap changer, variations in the ratio of the voltage of the alternating-voltage network to the voltage of the d.c. link must be taken up by means of variations of the control angle of the converter. This results in a undesirable increase of the reactive power consumption of the converter and/or of the variations of this consumption. If considered necessary, these disadvantages can be counteracted or eliminated by providing the converter on its alternating-voltage side with controllable reactive power means known per se, such as capacitors, inductors, or, for example, a combination of switched capacitors and phase-angle controlled inductors.

In those cases where an HVDC transmission according to the invention has a transformerless connection of the converter at one end of the d.c. link and a converter connection via a transformer, provided with a tap changer, at the other end of the link, it is suitable to allow the first-mentioned converter to work with a fixed control angle so chosen that the reactive power consumption is minimized, whereby variations in the ratio of the voltages of the alternating-voltage networks are taken up by the tap changer.

It has been found that the reaction on the alternating-voltage network by the HVDC transmission can be maintained especially low if a connection without the use of any separate winding transformer according to the invention is provided with a control system which controls each one of the two halves of a six-pulse converter individually in such a way that the direct currents in the two d.c. supply lines of the converter are always maintained as equal as possible.

We claim:

1. An HVDC transmission system with at least two converters, each converter having a.c. and d.c. supply lines, wherein each converter is connected between an alternating-voltage network and a dc link common to the converters, and wherein one of said at least a first converter is connected to a respective alternating-voltage network thereof without the use of any separate winding transformer, comprising:

at least one mutual inductor arranged on the dc side of said first converter, said mutual inductor having two windings each connected to a respective one of said dc supply lines of the converter and magnetically coupled to each other, the at least one mutual inductor being designed and connected to exhibit a high impedance to ground mode currents.

2. An HVDC transmission system according to claim 1, further comprising a back-to-back connection for transmission of power between a first a.c. network and a second a.c. network, and with a converter station with a first converter having an a.c. supply line connected to said first a.c. network and with a second converter having a.c. lines connected to said second network, said station having a d.c. connection forming said d.c. link and connecting the d.c. supply lines of the converters, and wherein both converters are connected with two converters dc-connected to each other, and wherein each converter is connected to a respective alternating voltage network without the use of any separate winding transformer and wherein a mutual inductor, common to the converters, is connected in the dc connection between the converters.

3. An HVDC transmission system according to claim 2, wherein at least one of the converters is connected to an alternating-voltage network, without the use of any separate winding transformer, via series capacitors arranged in the ac supply lines of the converter and includes a mutual inductor connected into the dc side thereof.

4. An HVDC transmission system according to claim 3 serving as a bipolar transmission system with at least one converter station with two converters, each one of which being dc-connected between one of the two pole conductors of the transmission system and a common ground line, wherein each one of the two converters in the station is connected to the alternating-voltage network of the station via series capacitors arranged in the ac supply lines of the converters.

5. An HVDC transmission system according to claim 4, wherein each one of the two converters of the station is associated with a mutual inductor, which has one of the windings thereof connected into the pole conductor connected to the converter, and the other winding connected into the current path between the converter and the common ground line.

6. An HVDC transmission system according to claim 2, wherein a current-limiting reactor is arranged in the a supply lines to said first converter.

7. An HVDC transmission system according to claim 2, in which each converter is provided on the alternating-voltage side thereof with harmonic filter circuits for filtering tones of the orders 6m+1, where m is a positive integer, and wherein the filter circuits of said first converter comprise filters for tones of the orders 5 and 7.

8. An HVDC transmission system according to claim 1, further comprising a dc line connecting two converters geographically separated from each other, and wherein each converter, which is connected to a respective alternating-voltage network without the use of the converter and has a mutual inductor connected into the d.c. supply lines thereof.

9. An HVDC transmission system according to claim 8, wherein at least one of the converters is connected to the alternating-voltage network thereof, without the use of any separate winding transformer, via series capacitors arranged in the ac supply lines of the converter and has a mutual inductor connected into the dc side thereof.

10. An HVDC transmission system according to claim 9, serving as a bipolar transmission and with at least one converter station with two converters, each one of which being dc-connected between one of the two pole conductors of the transmission and a common ground line, wherein each one of the two converters in the station is connected to the alternating-voltage network of the station via series capacitors arranged in the ac supply lines of the converters.

11. An HVDC transmission system according to claim 10, wherein each one of the two converters of the station is associated with a mutual inductor, which has one one of the windings thereof connected into the pole conductor connected to the converter, and the other winding connected into the current path between the converter and the common ground line.

12. An HVDC transmission system according to claim 8, wherein a current-limiting reactor is arranged in the ac supply lines to said first converter.

13. An HVDC transmission system according to claim 8, in which each converter is provided on the alternating-voltage side thereof with harmonic filter circuits for filtering tones of the orders 6m+1, where m is a positive integer, and wherein the filter circuits of said first converter comprise filters for tones of the orders 5 and 7.

14. An HVDC transmission system according to claim 1, wherein at least one of the converters is connected to a respective alternating voltage network, without the use of any separate winding transformer, via series capacitors arranged in the ac supply lines of the converter and including a mutual inductor connected into the dc supply lines thereof.

15. An HVDC transmission system according to claim 14, serving as a bipolar transmission system and with at least one converter station with two converters, each one of which being dc-connected between one of the two pole conductors of the transmission and a common ground line, wherein each one of the two converters in the station is connected to the alternating-voltage network of the station via series capacitors arranged in the ac supply lines of the converters.

16. An HVDC transmission system according to claim 15, wherein each one of the two converters of the station is associated with a mutual inductor having one of the windings thereof connected into the pole conductor connected to the converter, and the other winding connected into the current path between the converter and the common ground line.

17. An HVDC transmission system according to claim 1, wherein a current-limiting reactor is arranged in the ac supply lines to said first converter.

18. An HVDC transmission system according to claim 1, in which each converter is provided on an alternating-voltage side with harmonic filter circuits for filtering tones of the orders 6m+1, where m is a positive integer, and wherein the filter circuits of said first converter comprise filters for tones of the orders 5 and 7.

19. An HVDC transmission system according to claim 1, wherein a converter station with a first bridge which is connected, without the use of any separate winding transformer, to an alternating-voltage network and is dc series-connected to a second bridge which, via a first separate winding transformer, is connected to the alternating-voltage network.

20. An HVDC transmission system according to claim 19, wherein the second bridge has one dc supply line connected to the first bridge via a winding of the mutual inductor and another dc supply line connected to a first conductor of the dc link, the station comprises a third bridge which has a dc supply line connected to the first bridge via a second winding of the mutual inductor and a dc link connected to a second conductor of the dc link, and the third bridge via a second separate winding transformer is connected to the alternating-voltage network.

21. An HVDC transmission system according to claim 20, wherein the separate winding transformers of the second and third bridges are Y/delta-connected.

22. An HVDC transmission system according to claim 20, wherein the second and third bridges are designed for lower rated power than the first bridge.

* * * * *